(12) United States Patent
Fujimoto

(10) Patent No.: US 7,870,514 B2
(45) Date of Patent: Jan. 11, 2011

(54) METHOD OF DESIGNING A PATTERN

(75) Inventor: Masashi Fujimoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 272 days.

(21) Appl. No.: 11/867,841

(22) Filed: Oct. 5, 2007

(65) Prior Publication Data
US 2008/0086712 A1    Apr. 10, 2008

(30) Foreign Application Priority Data
Oct. 5, 2006   (JP)   ............... 2006-274440

(51) Int. Cl.
*G06F 17/50* (2006.01)
(52) U.S. Cl. ............................ 716/1; 716/10
(58) Field of Classification Search ............ 716/1, 716/10
See application file for complete search history.

(56) References Cited

U.S. PATENT DOCUMENTS

| | | | |
|---|---|---|---|
| 6,893,801 B2* | 5/2005 | Inoue et al. | 430/311 |
| 7,376,931 B2* | 5/2008 | Kokubun | 716/21 |
| 7,399,558 B2* | 7/2008 | Yamazoe et al. | 430/5 |
| 2003/0152873 A1* | 8/2003 | Tainaka et al. | 430/313 |
| 2004/0166422 A1* | 8/2004 | Yamazoe et al. | 430/5 |
| 2005/0138598 A1* | 6/2005 | Kokubun | 716/20 |
| 2005/0142454 A1* | 6/2005 | Fujimoto et al. | 430/5 |

FOREIGN PATENT DOCUMENTS

| | | |
|---|---|---|
| JP | 2005-183793 | 7/2005 |
| JP | 2005-189683 | 7/2005 |

* cited by examiner

*Primary Examiner*—Jack Chiang
*Assistant Examiner*—Suchin Parihar
(74) *Attorney, Agent, or Firm*—Young & Thompson

(57) ABSTRACT

A method of designing a pattern of a hole pattern having a configuration, in which grid of interval smaller than a minimum permissible pitch according to a design rule for a semiconductor integrated circuit is provided in a pattern drawing, a hole pattern is arranged on a first lattice point which is an intersection of the grid, and, at the same time, other hole patterns are not arranged on a second lattice point group which is on the periphery of the first lattice point, and is adjacent to the first lattice point is provided. And, the number of hole patterns, which may be arranged in a third lattice point group of a plurality of lattice points which are on the periphery of a second lattice point group and are within a predetermined distance from the first lattice point, is controlled.

10 Claims, 6 Drawing Sheets

| PATTERN | NUMBER |
|---|---|
|  | 1 |
| (a)   (b)  | 2 |
|  | 3 |
|  | 4 |

| PATTERN | NUMBER |
|---|---|
|  | 1 |
|  | 2 |
|  | 3 |
| ⋮ | ⋮ |

METHOD OF DESIGNING A PATTERN

This application is based on Japanese patent application NO. 2006-274440, the content of which is incorporated hereinto by reference.

BACKGROUND

1. Technical Field

The present invention relates to a method of designing a pattern.

2. Related Art

Conventionally, there has been used a method of designing a layout, in which hole patterns for a semiconductor integrated circuit are arranged on lattice points of an orthogonally crossing virtual grid. The following advantages may be obtained by the above configuration in which the hole patterns are arranged on the lattice points of a virtual grid.

A first advantage is that the method is adoptable to an automatic interconnect arrangement tool using computer aided design (CAD). In the CAD executing processing according to a program stored beforehand, interconnects may be easily arranged as a circuit design by arranging cells, interconnect patterns, and the hole patterns on lattice points defined according to the circuit design.

A second advantage is that photolithography may be preferably performed. By arranging the hole patterns at the lattice points, which are intersections of the virtual grid of equal interval, so as to form array when arranging the hole patterns, the hole patterns with a size and a shape in conformity to a target may be easily processed onto a photoresist by utilizing interference of lights from adjacent hole patterns in an exposure process. Moreover, another advantage is that a correction form may be easily generated in optical proximity correction (OPC) only by arranging the hole patterns on the lattice points of the virtual grid without arranging the patterns in an array.

Japanese Laid-Open Patent Publication No. 2005-189683 has disclosed a technique in which a grid of interval smaller than a minimum permissible pitch according to a design rule for a semiconductor integrated circuit is provided in a pattern drawing to arrange hole patterns on lattice points which are intersections of the grid.

And, Japanese Laid-Open Patent Publication No. 2005-183793 has disclosed a method of designing a layout, in which hole patterns are arranged on lattice points, which are intersections of an orthogonally crossing virtual grid, and other hole patterns are not arranged on an adjacent lattice point which is a lattice point nearest to the lattice point, on which a hole pattern is arranged. Here, it has been considered that the size of a virtual grid may be smaller than a resolution pitch limit of a hole pattern in an exposure process for a semiconductor integrated circuit.

By configuring the virtual grid with a size smaller than a minimum permissible pitch (resolution pitch limit) according to a design rule, flexibility in arrangement of the hole patterns may be improved. Thereby, the circuit pattern area may be reduced.

However, the inventor has found a phenomenon in which, in a case in which the size of a virtual grid is smaller than a resolution pitch limit as described above, and a number of hole patterns in a certain area is increased, a dimensional error becomes larger when a reticle pattern is lithographed onto a resist pattern.

SUMMARY

In one embodiment, there is provided a method of designing a pattern, in which a grid of interval smaller than a minimum permissible pitch according to a design rule for a semiconductor integrated circuit is provided in a pattern drawing, a hole pattern is arranged on a lattice point which is an intersection of the grid, and other hole patterns are not arranged on lattice points which are adjacent to the lattice point on which the hole pattern is arranged, the method including: assuming a region including a first lattice point, a second lattice point group, and a third lattice point group as an arrangement restricted region of the first lattice point, a hole pattern being arranged on the first lattice point, the second lattice point group being of a plurality of lattice points which are on the periphery of the first lattice point, and are adjacent to the first lattice point, and the third lattice point group being of a plurality of lattice points which are on the periphery of the second lattice point group, and are within a predetermined distance from the first lattice point; setting an upper limit for the number of hole patterns to be arranged in the third lattice point group in the arrangement restricted region of the assumed first lattice point; and in the pattern drawing, assuming, for each hole pattern to be arranged on the lattice point, a lattice point on which the hole pattern is arranged as the first lattice point and arranging hole patterns not more than the upper limit in the third lattice point group of the arrangement restricted region.

The inventor has found that, in a case in which a grid is provided with interval smaller than a minimum permissible pitch according to a design rule for a semiconductor integrated circuit to arrange hole patterns on lattice points of the grids, the more number of other hole patterns exist within (not outside or beyond) a predetermined distance from the related hole pattern, the more the resist pattern effects on a dimensional error.

For example, when an amplification factor of a dimensional error of a resist pattern to a reticle dimensional error is used as the dimensional error of the resist pattern, it is generally required that the amplification factor is not more than four to five. If the amplification factor is six for example, and when the dimensional error of the reticle pattern is 2 nanometers on a wafer basis, the dimensional error of the resist pattern is as large as 2×6=12 nanometers. Thereby, the hole patterns are required to be arranged in such a way that the amplification factor is a value lesson more than a predetermined value (for example, four to five).

With the method of designing a pattern according to the present invention, the circuit pattern area may be reduced, and, at the same time, the dimensional error of the resist pattern may be decreased because the grid size is reduced, and, at the same time, a number of other hole patterns arranged in an area within the predetermined distance from the hole pattern is limited as described above.

Here, the grid size may be configured to be smaller than the resolution pitch limit of the hole pattern, and the value of two times of the grid size is not equal to or more than the resolution pitch limit of the hole pattern. When the resolution pitch limit (minimum pitch) is assumed to be d, for example, the grid interval D may be set satisfying D=d/2.

According to the present invention, the circuit pattern area is reduced, and, at the same time, the dimensional accuracy of the hole pattern may be improved.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

Figure 1:
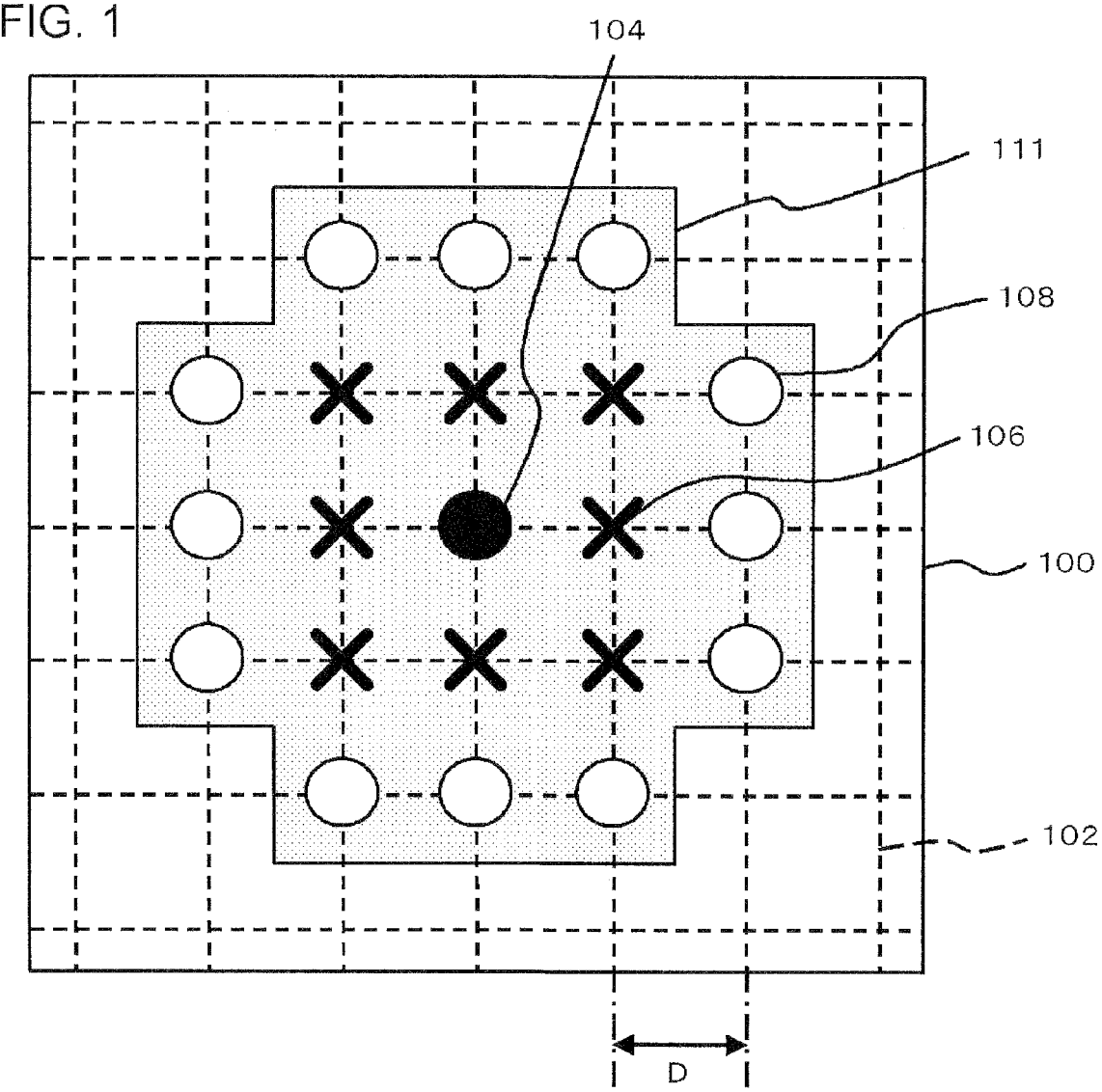
FIG. 1 is a view showing a pattern drawing of a semiconductor integrated circuit according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, embodiments according to the present invention will be explained, with referent to drawings. Here, similar components will be denoted by the same reference numerals in all drawings, and same description will not be repeated.

In the following embodiments, there will be explained a method of designing a pattern, in which a virtual grid of interval smaller than a minimum permissible pitch according to a design rule for a semiconductor integrated circuit is provided in a pattern drawing, a hole pattern is arranged on a lattice point which is an intersection of the virtual grid, and, at the same time, other hole patterns are not arranged on lattice points which are adjacent to the lattice point on which the hole pattern is arranged.

First Embodiment

FIG. 1 is a view showing a pattern drawing of a semiconductor integrated circuit according to the present embodiment.

In a pattern drawing 100, a grid 102 of an interval smaller than a minimum permissible pitch "d" according to a design rule for the semiconductor integrated circuit is provided. Here, the interval "D" of the grid 102 may be set to $D=d/2$.

Here, it is assumed that a lattice point on which a hole pattern is arranged is a first lattice point 104, a plurality of lattice points which are on the periphery of the first lattice point 104 and are adjacent to the first lattice point 104 are a second lattice point group 106 and a plurality of lattice points which are on the periphery of the second lattice point group 106, and are within a predetermined distance "L" from the first lattice point 104 are a third lattice point group 108. In the present embodiment, it is assumed that a region including the first lattice point 104, the second lattice point group 106, and the third lattice point group 108 is an arrangement restricted region 111 of the first lattice point 104. In the present embodiment, the predetermined distance "L" may be set to $(5)^{1/2} \times D$. In this case, the number of lattice points included in the third lattice point group 108 is "12". The predetermined distance "L" may be set as suitable, depending on the grid interval, the minimum permissible pitch according to the design rule for of the semiconductor integrated circuit, and the like.

Hole patterns are not arranged in the second lattice point group 106 since on lattice points adjacent to the lattice point 104 on which a hole pattern is arranged, other hole patterns are not arranged in the present embodiment as described above. The number of hole patterns which may be arranged in the third lattice point group 108 is controlled in the present embodiment.

Figure 2:
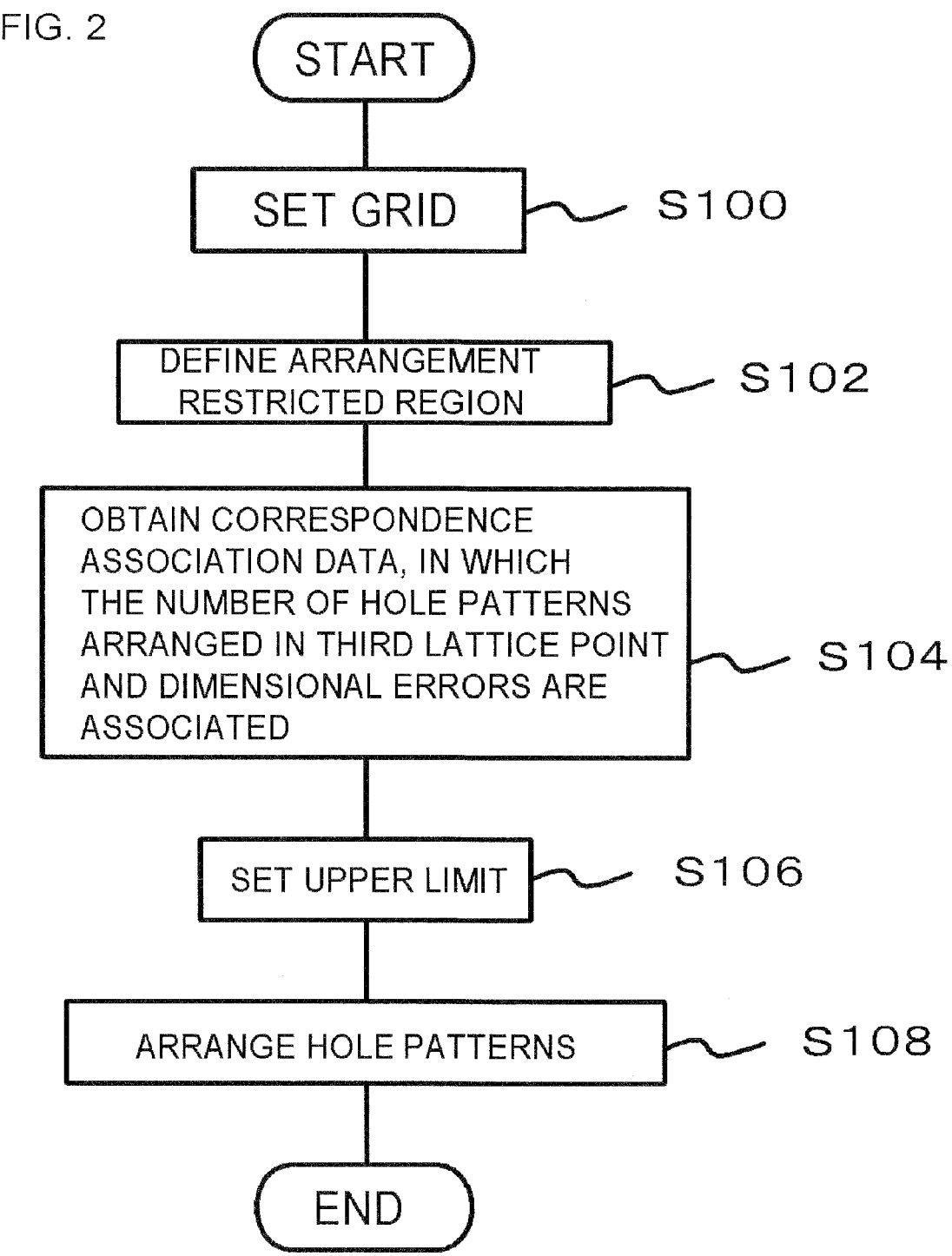
FIG. 2 is a flow diagram showing a procedure for designing a pattern according to the embodiment of the present invention.

The number of the hole patterns which may be arranged in the third lattice point group 108 is determined as follows. Hereinafter, explanation will be made, further referring to FIG. 2. FIG. 2 is a flow diagram showing a procedure for designing a pattern according to the present embodiment.

As described above, the grid 102 is set and provided (S100) and the arrangement restricted region 111 is defined (S102). Specifically, the predetermined distance "L" is determined. Subsequently, masks are made for each of a plurality of patterns with different numbers of hole patterns arranged in the third lattice point group 108, resist films are patterned using the masks and correspondence association data, in which dimensional errors of obtained resist patterns are associated with the numbers of the hole patterns arranged in the third lattice point group, are obtained (S104). Here, the dimensional error may be assumed to be an amplification factor of a resist pattern dimensional error to a reticle dimensional error.

Subsequently, based on the associations obtained at the step S104, the maximum number of the hole patterns having a dimensional error of a predetermined value or less is set as an upper limit of the number of the hole patterns which may be arranged in the third lattice point group 108 (S106).

Then, in the pattern drawing 100, the hole patterns are arranged so that for each hole pattern to be arranged, hole patterns not more than the upper limit are arranged in the third lattice point group 108 of the arrangement restricted region 111, assuming a lattice point on which the each hole pattern is arranged is the first lattice point 104 (S108). Thereby, the pattern is designed.

Next, there will be explained a procedure to obtain correspondence association data between the numbers of the hole patterns and the dimensional errors of the corresponding resist patterns at the step S104.

Figure 3:
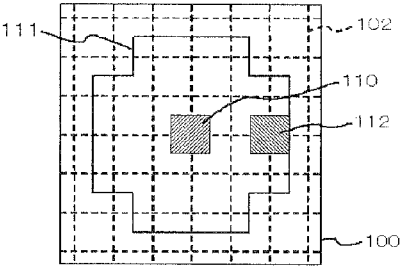
FIG. 3 is a view showing examples of the pattern drawing, in each of which a hole pattern is arranged at a first lattice point, and, at the same time, hole patterns are arranged in a third lattice point group.
Figure 3:
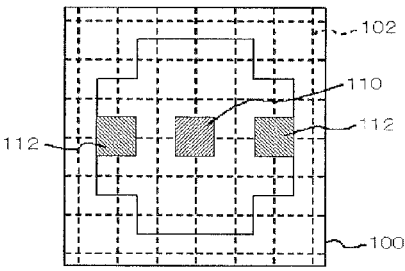
Figure 3:
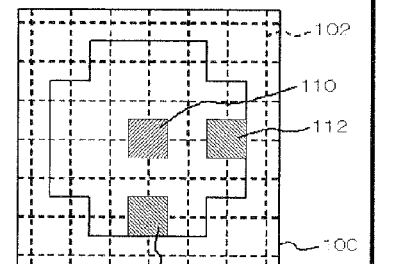
Figure 3:
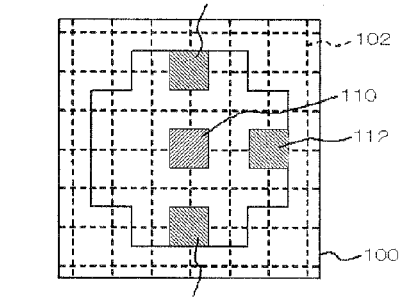
Figure 3:
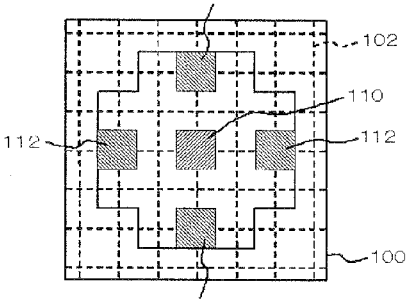

FIG. 3 is a view showing examples of the pattern drawing 100, in each of which one, two, three, or four hole patterns 112 are arranged in the third lattice point group 108 for the hole pattern 110 arranged at the first lattice point 104.

Based on the above pattern drawing 100, reticles are made, and patterning onto a resist film is performed, using the reticles. The dimensional errors for the actually made reticles and the corresponding resist films are measured for each of the above patterns. Subsequently, an amplification factor of the resist pattern dimensional error to the reticle dimensional error is obtained.

The amplification factor of the resist pattern dimensional error to the reticle dimensional error may be calculated as follows. For example, when a design value $n_1$ of the diameter of a hole pattern is 100 nanometers, a reticle dimension $n_2$ is 101 nanometers, and a resist dimension $n_3$ is 105 nanometers, the amplification factor=$(n_3-n_1)/(n_2-n_1)=(105-100)/(101-100)=5$. The above reticle dimension of 101 nanometers is a number converted for the wafer, and an actual dimension on the reticle is 404 nanometers for a 4-times reticle.

Figure 4:
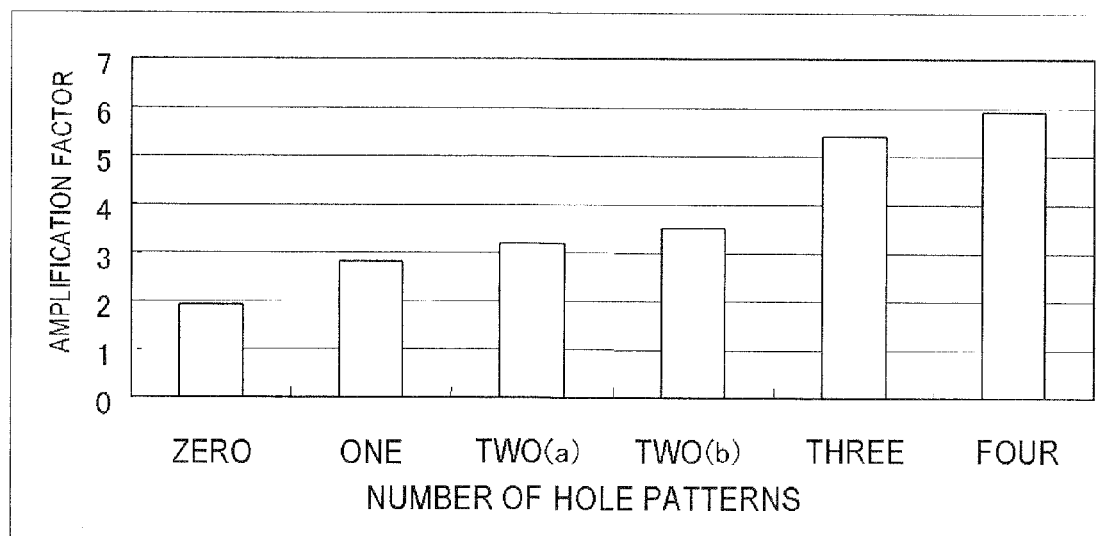
FIG. 4 is a view showing association between numbers of hole patterns and amplification factors of resist pattern dimensional errors to reticle dimensional errors.

FIG. 4 is a view showing correspondence association data, in which the numbers of the hole patterns and the amplification factors of the resist pattern dimensional errors to the reticle dimensional errors are associated.

When the number of the hole patterns is two, the amplification factor of the resist pattern dimensional error to the reticle dimensional error becomes not more than four. On the other hand, when the number of the hole patterns is three or more, the amplification factor becomes more than five. Here, if the number of the hole patterns is controlled to limit the amplification factor not more than four or five, the upper limit for the number of the hole patterns which may be arranged in the third lattice point group 108 becomes "2".

Here, only a part of conceivable pattern drawings is shown in FIG. 3. When a plurality of patterns are conceivable in order to arrange the certain number of hole patterns, the following processing is performed for all the patterns respectively: a reticle is made, patterning of a resist film using the reticle is performed, and the reticle dimensional error and the resist pattern dimensional error are measured. Subsequently, the amplification factors are calculated. Next, a highest amplification factor among those of the plurality of the patterns may be used as an amplification factor for the certain number of the hole patterns. Two examples in which the number of the hole patterns arranged in the third lattice point group 108 is two are shown as (a) and (b) in the FIG. 3 and FIG. 4, for example. And, the pattern (b) has a larger amplification factor than that of the pattern (a). Therefore, the data for the pattern (b) may be used as data for the case in which the number of the hole patterns is two.

A pattern is designed as described above. Thereafter, a reticle (photo mask) for forming hole patterns is made based on the pattern, and using the reticle, patterning of a resist film is performed, to manufacture an actual semiconductor device.

With the method of designing a pattern according to the embodiment, the grid size may be reduced and, at the same time, in an area within a predetermined distance from a hole pattern, the limited number of other hole patterns may be arranged. Thereby the circuit pattern area may be decreased and, at the same time, the resist pattern dimensional error may be reduced.

Second Embodiment

The present embodiment differs from the first embodiment in a point that a predetermined distance "L" is set to $(8)^{1/2} \times D$ when defining an arrangement restricted region 111. Other than that, the embodiment is similar to the first embodiment.

Figure 5:
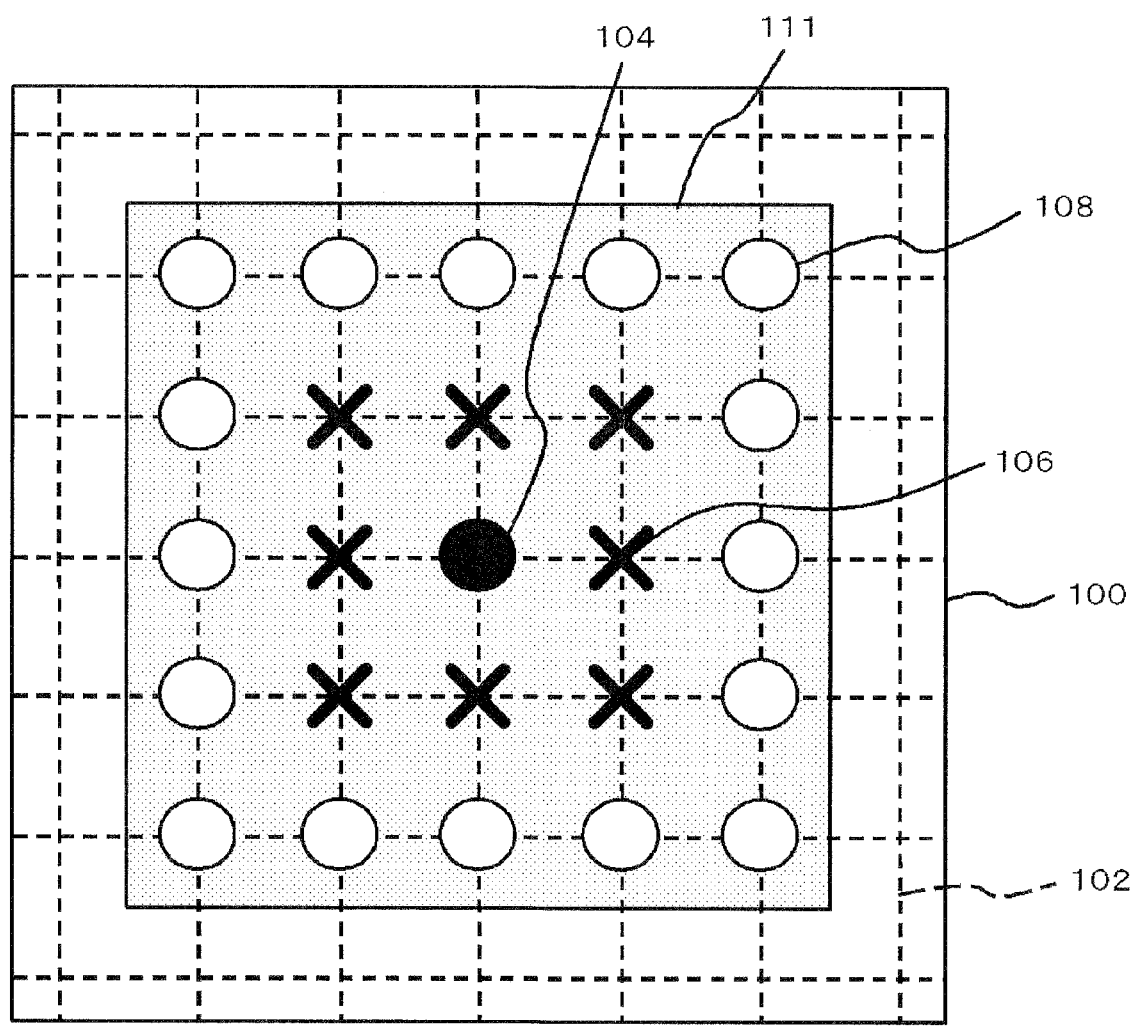
FIG. 5 is a view showing another pattern drawing for the semiconductor integrated circuit according to an embodiment of the present invention.

FIG. 5 is a view showing a pattern drawing for a semiconductor integrated circuit according to the embodiment. In this case, a number of lattice points included in a third lattice point group 108 is "16".

Figure 6:
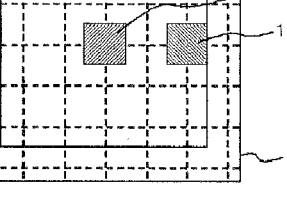
FIG. 6 is a view showing examples of the pattern drawing, in each of which a hole pattern is arranged at a first lattice point, and, at the same time, hole patterns are arranged in a third lattice point group.
Figure 6:
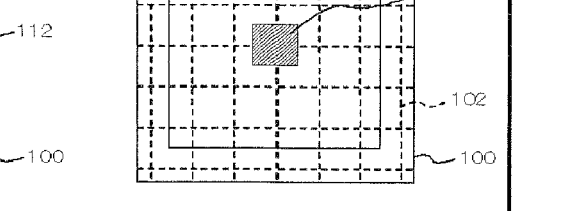
Figure 6:
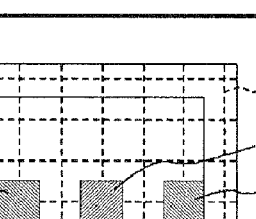

FIG. 6 is a view showing examples of a pattern drawing 100, in each of which one, two, or three hole patterns 112 are arranged in the third lattice point group 108 for the hole pattern 110 arranged at a first lattice point 104. Here, only a part of conceivable pattern drawings is shown in FIG. 6.

Also in the present embodiment, when a plurality of patterns are conceivable in order to arrange a certain number of hole patterns, the following processing is performed for all patterns respectively: a reticle is made, patterning of resist films using the reticle is performed, and the reticle dimensional error and the resist pattern dimensional error are measured. Subsequently, the amplification factors are calculated. Next, a highest amplification factor among those of the plurality of the patterns may be used as an amplification factor for the certain number of the hole patterns.

Also with the method of designing a pattern according to the embodiment, similar advantages to those of the method according to the first embodiment may be obtained. Moreover, dimensional accuracy may be further improved by increasing the predetermined distance "L".

Though the embodiments according to the present invention have been described above, referring to the drawings, the above embodiments are to be considered as illustrative, and various kinds of configurations other than the above embodiments may be adopted.

When obtaining correspondence association data, in which the numbers of the hole patterns are associated with the amplification factors of the resist pattern dimensional error to the reticle dimensional error, starting with patterns having the smallest number of hole patterns, reticles may be made, patterning of resist films may be performed, and the amplification factors may be calculated. Then, when an amplification factor exceeds a desired value, it is not required to obtain correspondence association data for larger number of hole patterns. For example, in the above-described embodiments, an example in which the amplification factor is obtained for a case in which the number of hole patterns arranged in the third lattice point group 108 is four is shown in FIG. 3 and FIG. 4. However, for example, the amplification factors are obtained as increasing the number of hole patterns arranged in the third lattice point group 108 as one, two, three, and if the amplification factor exceeds a desired value (for example, four) when the number of hole patterns is four, processing may be finished without obtaining data for four pieces.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

What is claimed is:

1. A method of designing a pattern by using a computer, in which a grid of grid interval D, which is smaller than a minimum permissible pitch d according to a design rule for a semiconductor integrated circuit, is provided in a pattern drawing, a hole pattern is arranged on a lattice point which is an intersection of said grid, and other hole patterns are not arranged on lattice points which are adjacent to, but are a single lattice point away from, said lattice point on which said hole pattern is arranged and said other hole patterns are arranged on lattice points which are adjacent to, but are two lattice points away from said lattice point on which said hole pattern is arranged, said method comprising:

determining a region using the computer including a first lattice point, a second lattice point group, and a third lattice point group as an arrangement restricted region of said first lattice point, a hole pattern being arranged on said first lattice point, said second lattice point group being of a plurality of lattice points which are on the periphery of said first lattice point, and are adjacent to said first lattice point, and said third lattice point group being of a plurality of lattice points which are on the periphery of said second lattice point group, and are within a predetermined distance from said first lattice point; and setting an upper limit for the number of hole patterns to be arranged in said third lattice point group in said arrangement restricted region of said determined first lattice point, and in said pattern drawing, assigning, for each hole pattern to be arranged on said lattice point, a lattice point on which said hole pattern is arranged as said first lattice point and arranging hole patterns not more than said upper limit in said third lattice point group of said arrangement restricted region.

2. The method of designing a pattern according to claim 1, wherein said setting upper limit for the number of hole patterns to be arranged in said third lattice point group includes:
obtaining correspondence association data in which dimensional errors of resist patterns formed by making masks for each of a plurality of patterns with different numbers of hole patterns arranged in said third lattice point group and patterning resist films using said masks, and the numbers of said hole patterns arranged in said third lattice point group of said masks, respectively, are associated; and setting the maximum number of said hole patterns having said dimensional error of a predetermined value or less as said upper limit based on said correspondence association data.

3. The method of designing a pattern according to claim 1, wherein said predetermined distance is $(5)^{1/2} \times D$.

4. The method of designing a pattern according to claim 2, wherein said predetermined distance is $(5)^{1/2} \times D$.

5. The method of designing a pattern according to claim 1, wherein said predetermined distance is $(8)^{1/2} \times D$.

6. The method of designing a pattern according to claim 2, wherein said predetermined distance is $(8)^{1/2} \times D$.

7. The method of designing a pattern according to claim 1, wherein said grid interval satisfies $D=d/2$.

8. The method of designing a pattern according to claim 2, wherein said grid interval satisfies $D=d/2$.

9. The method of designing a pattern according to claim 2, wherein said dimensional error is an amplification factor of a resist pattern dimensional error to a reticle dimensional error.

10. The method of designing a pattern according to claim 1, wherein the upper limit for the number of the hole patterns which are arranged in said third lattice point group is "2".

* * * * *